Patent [19]

Cook

[11] 4,338,668
[45] Jul. 6, 1982

[54] MODULATOR FOR ANTI-SKID BRAKING SYSTEM

[75] Inventor: Robert D. Cook, Valencia, Calif.

[73] Assignee: Crane Co., Chicago, Ill.

[21] Appl. No.: 147,385

[22] Filed: May 7, 1980

[51] Int. Cl.³ .......................... B60T 8/00; G06F 15/20
[52] U.S. Cl. .................................... 364/426; 303/95; 303/109
[58] Field of Search .................... 364/426; 303/95, 97, 303/103, 106, 107, 109

[56] References Cited

U.S. PATENT DOCUMENTS

| | | | |
|---|---|---|---|
| 3,523,712 | 8/1970 | Leiber | 303/97 |
| 3,724,916 | 4/1973 | Hirzel | 303/109 |
| 3,727,992 | 4/1973 | Bowler et al. | 303/107 |
| 3,838,890 | 10/1974 | Wind | 303/107 |
| 3,889,128 | 6/1975 | Luhdorff | 303/97 X |
| 3,951,466 | 4/1976 | Guagliumi et al. | 303/97 |
| 3,964,796 | 6/1976 | Bremer | 303/107 |
| 4,076,332 | 2/1978 | Taylor et al. | 303/107 X |

Primary Examiner—Jerry Smith
Attorney, Agent, or Firm—Hume, Clement, Brinks, Willian & Olds, Ltd.

[57] ABSTRACT

An improved modulator for an anti-skid brake control system generates a modulated brake control signal as a time integral function of the difference between an input signal indicative of a braking condition and a variable threshold signal. The preferred embodiment includes a computer which stores a number of rate values. An appropriate one of these values is selected depending on the magnitude of the difference between the input signal and the threshold signal. This rate value is then added to the previous modulated brake control signal to generate an updated modulated brake control signal.

21 Claims, 6 Drawing Figures

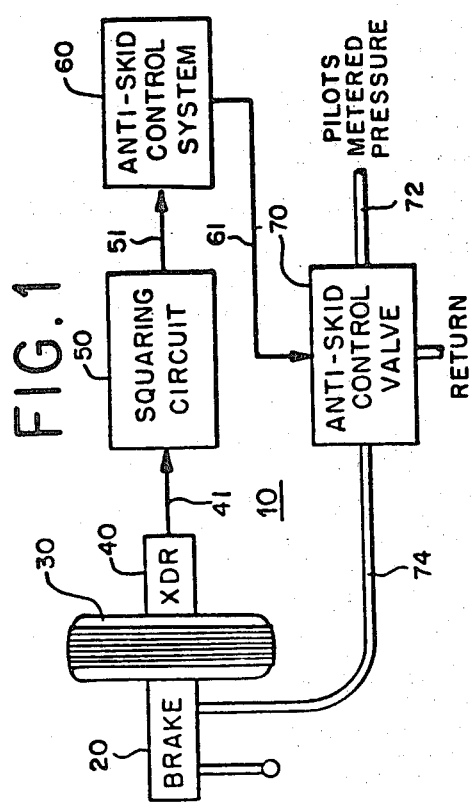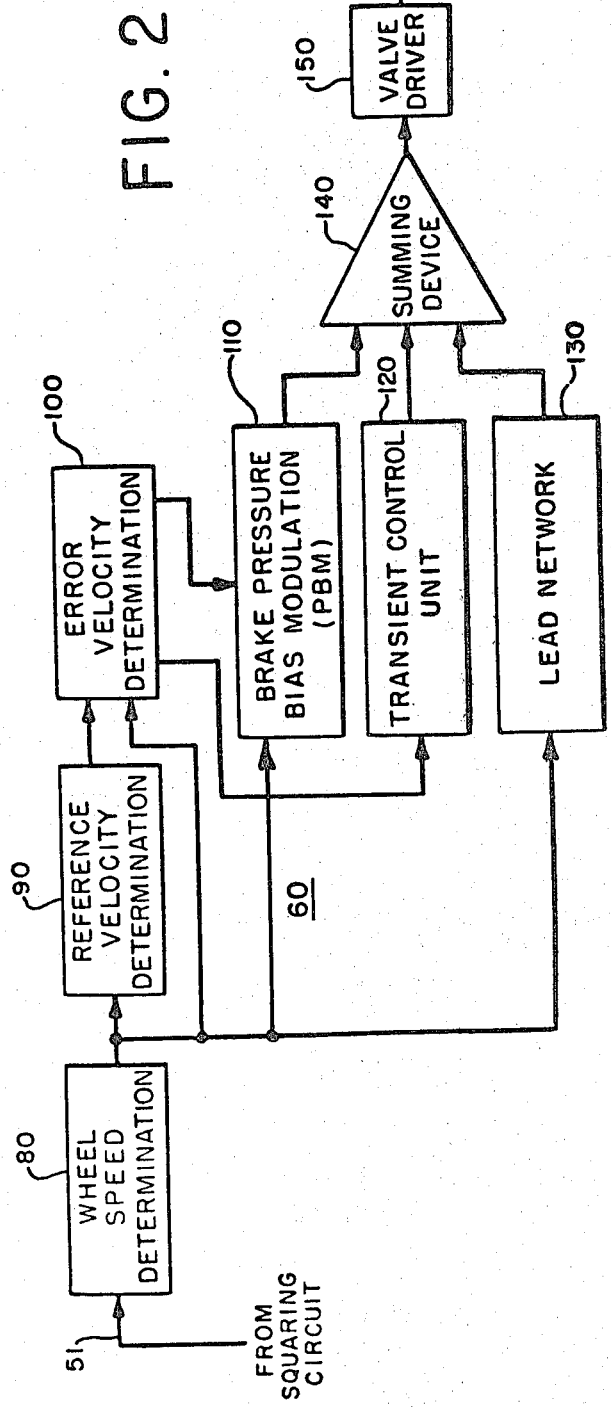

MODULATOR FOR ANTI-SKID BRAKING SYSTEM

BACKGROUND OF THE INVENTION

This invention relates to an improved modulator for an anti-skid braking system.

One important class of modern anti-skid systems utilizes a modulator to provide a smoothly varying, continuous brake control signal. An early example of such systems is disclosed in U.S. Pat. No. 3,724,916, issued Apr. 3, 1973 to Edgar A. Hirzel and assigned to the assignee of the present invention. Such anti-skid systems have achieved a high level of commercial success, particularly for use with large jet transports such as the Boeing 727, 737 and 747 aircraft.

The modulators in these anti-skid systems generate a modulated brake control signal as a time integral function of an input signal indicating a braking condition. In one type of modulator, the input signal is an error signal corresponding to the difference between measured wheel velocity and a reference velocity. This error signal is related to the slip velocity of the braked wheel with respect to the pavement. In another type of modulator, the input signal corresponds to measured wheel deceleration. In either case, the modulated brake control signal varies smoothly and continuously as a time integral function of the input signal.

In the past, such modulators have failed to provide an optimal level of flexibility and certain compromises have been necessary to design a modulator which provides the highest level of braking efficiency.

SUMMARY OF THE INVENTION

The present invention is directed to an improved modulator which provides increased flexibility and braking efficiency.

According to this invention, a modulator is provided with means for generating a modulator rate signal as a function of the input signal discussed above such that the change in the modulator rate signal for a selected change in the input signal varies as a function of the input signal. The modulated brake control signal is then generated as a time integral function of the modulator rate signal.

Since the rate signal varies as a non-linear function of the input signal, the modulator can be designed to respond to large input signals in a manner which is not merely proportional to the response to small input signals. In particular, a modulator can be provided which independently optimizes modulator performance for both small and large values of the input signal.

In the presently preferred embodiment, it has been found preferable to provide a sharp discontinuity in the rate signal at the point where the input signal has a low value corresponding to a threshold value. This discontinuity tends to keep the modulator aggressively seeking the point of optimum braking efficiency. In addition, this embodiment provides a gain (defined as the ratio between the rate signal and the input signal) which generally decreases for larger input signals. This decreasing gain has been found to optimize the manner in which the modulator reacts to deep skids, in one simulated application.

Thus, the present invention provides an apparatus in which modulator response to large input signals can be varied with respect to modulator response to small input signals. This feature of the invention provides additional freedom in modulator design which can be used to improve braking efficiency.

The invention itself, together with further objects and attendant advantages, will best be understood by reference to the following detailed description taken in connection with the accompanying drawings.

BRIEF DESCRIPTION OF THE DRAWINGS

FIG. 1 is a block diagram of a brake control system including an anti-skid control system.

FIG. 2 is a detailed block diagram of the functional components of the anti-skid control system of FIG. 1.

DETAILED DESCRIPTION OF A PREFERRED EMBODIMENT

Figure 3:
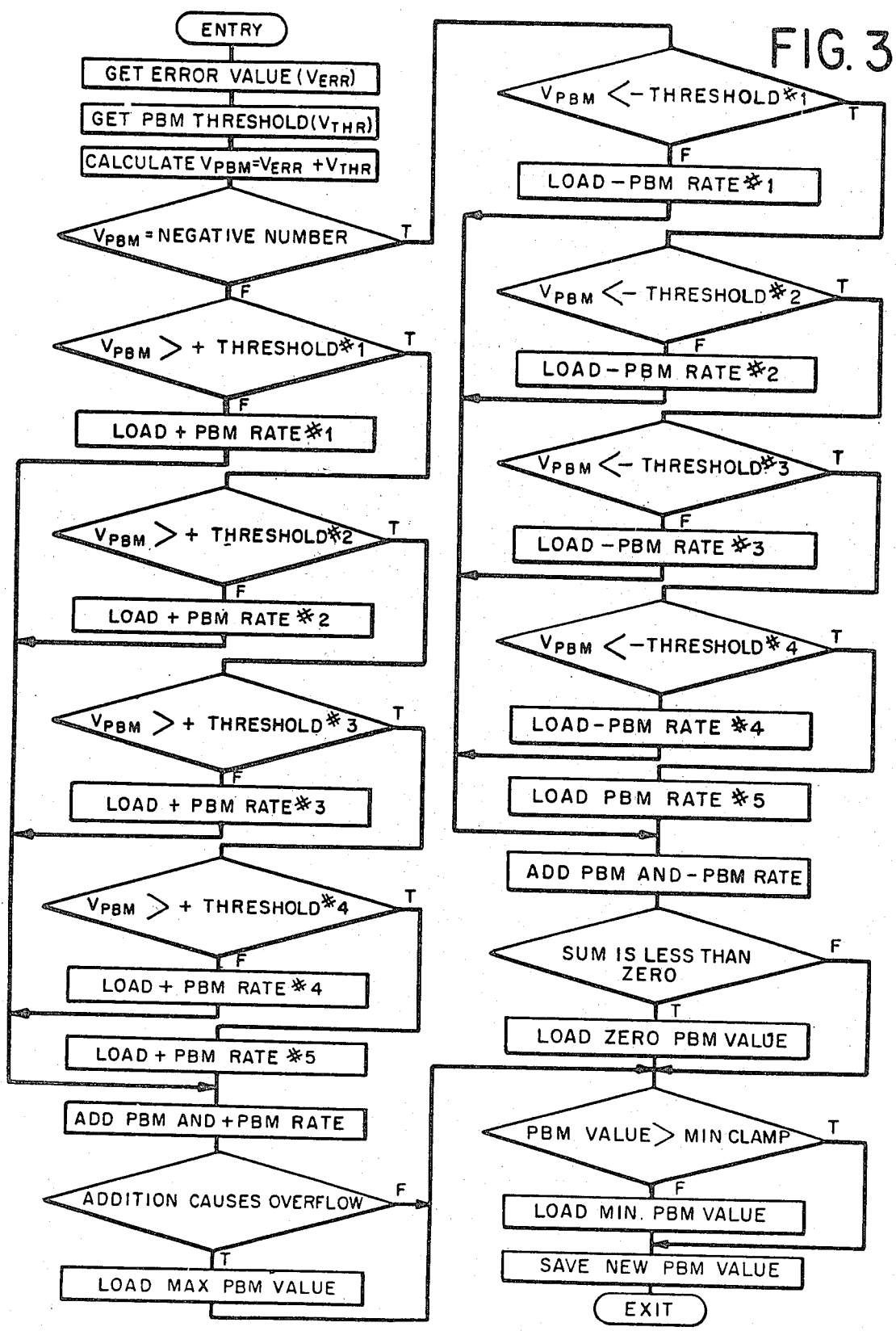
FIG. 3 is a flowchart of a portion of the brake pressure bias modulation (PBM) determination unit of FIG. 2.

Referring now to the drawings, a preferred embodiment of the improved modulator of the present invention will be described in connection with the brake control system shown in FIGS. 1 and 2. FIG. 1 shows the major components of an anti-skid brake control system 10 which provides brake control for the brake 20 of the rotatable wheel 30. The system 10 includes a wheel speed transducer 40 which provides a sinusoidal signal on the line 41 having a frequency proportional to the angular velocity of the wheel 30. The signal on line 41 is shaped in a squaring circuit 50 and is then supplied as a wheel speed signal to an anti-skid control system 60 via line 51. The anti-skid control system 60 monitors the wheel signal on line 51. When the wheel signal indicates that the wheel 30 is about to go into a skid due to excessive braking force, the anti-skid control system 60 generates a brake control signal on line 61. The anti-skid control valve 70 is positioned in the brake line 72 which supplies brake fluid under pressure to the brake 20, and the valve 70 operates in response to the signal on line 61 to reduce the brake pressure applied to the brake 20.

In this preferred embodiment, the brake pressure in line 72 is the metered pressure determined by the vehicle operator by means of conventional hydraulic controls. As long as the wheel 30 is not braked so severely as to go into a skid, the full metered pressure on the line 72 is passed by the valve 70 via the line 74 to the brake 20. However, if the metered brake pressure exceeds the skid threshold and drives the wheel 30 into a skid, the anti-skid system 60 will generate a brake control signal on line 61 which causes the valve 70 to reduce the pressure in the line 74 to a value less than the metered pressure. By reducing the pressure applied to the brake 30, the braking torque is reduced and the wheel 30 is prevented from skidding.

FIG. 2 shows a schematic representation of the anti-skid system 60 of FIG. 1, including a wheel speed determination unit 80 which receives the wheel signal on line 51 as an input and generates an output signal representative of measured wheel speed. This wheel speed signal is supplied as an input to a reference velocity determination unit 90 for generating a reference velocity signal. This reference velocity signal is supplied as an input to an apparatus 100 for determining an error velocity signal representative of the difference between the measured wheel speed signal and the reference velocity signal. The error velocity signal is applied as an input to two separate control units: the brake pressure bias modulation (PBM) unit, or modulator 110, and the transient control unit 120. The modulator 110 is described in detail below in connection with FIGS. 3-6 and Tables 1-4. Here it is enough to state that the modulator 110 generates a modulated brake control signal representative of the optimum braking pressure. The signal is smoothly, continuously modulated either to increase or decrease the applied brake pressure to substantially prevent excessive wheel skidding while maintaining a high, effective level of braking.

Because the output of the modulator 110 varies smoothly and continuously with time, it will on occasion be unable to respond quickly enough to prevent a wheel skid. For example, when a braked wheel suddenly enters a tar strip or an ice patch or a wet surface, the braking coefficient will abruptly fall and the modulator 110 may be unable to prevent a deep skid if the wheel 30 is heavily braked. Under these conditions, the transient control unit 120 responds to a large error velocity signal by commanding a sharp and sudden reduction in applied brake pressure.

The wheel speed signal is also applied as an input to a lead network 130 which responds to changes in the wheel speed signal to anticipate trends and to command an early modification in brake pressure to anticipate skids.

Outputs from the modulator 110, the transient control unit 120, and the lead network 130 are summed in a summing device 140 to produce a brake control signal which is amplified by the valve driver 150 and then applied as a control signal via line 61 to the anti-skid control valve 70.

The foregoing description of the brake control system 10 is provided to set forth the environment of a preferred embodiment of the modulator of this invention. With the exception of the modulator 110, individual components of this environment do not form a part of the present invention, and for that reason will not be described in detail here. Furthermore, those skilled in the art are familiar with various forms of these components. For example, one form of the wheel speed determination unit 80, the error velocity determination unit 100, and the transient control unit 120 is shown in U.S. Pat. No. 3,724,916, issued Apr. 3, 1973 to Edgar A. Hirzel, and entitled "Controlled Wheel Braking System". Other forms of the wheel speed determination unit 80 are described in U.S. Pat. No. 4,056,287, issued Nov. 1, 1977 to Wolfgang Gudat; in U.S. Pat. No. 4,125,295, issued Nov. 14, 1978 to Gerhard Ruhnam, et al.; and in U.S. Pat. No. 4,184,203, issued Jan. 15, 1980 to Thomas Skarvada and assigned to the assignee of the present invention.

The present invention is directed to an improved modulator for a brake control system. The presently preferred embodiment of this invention, included in modulator 110 of FIG. 2, will be described in conjunction with the flow charts of FIGS. 3 and 4 and the graphs of FIGS. 5 and 6. The presently preferred embodiment of this invention is implemented as a programmed microprocessor. The presently preferred microprocessor is a Z-80 CPU manufactured by Zilog, Inc., Cupertino, Cal. The program is presented in flow chart form in FIGS. 3 and 4 and is listed in assembly language form in Tables 1-4.

This program is executed periodically (203 times each second in the preferred embodiment) to generate a modulated brake control signal. This modulated brake control signal is then added to signals produced by the transient control unit 120 and the lead network 130, and the resulting signal is used to control the valve driver 150.

As mentioned earlier, the improved modulator of this invention can be used with a wide variety of brake control systems. This preferred embodiment utilizes two dynamic variables generated by the remainder of the brake control system.

First, this preferred embodiment accepts as an input the most recent measurement of wheel velocity, which is labelled VELOC1 in the listings. In this embodiment, VELOC1 is updated 203 times per second by the wheel speed determination unit 80.

Second, this embodiment accepts as an input the error velocity signal generated by the error velocity determination unit 100. This signal is labelled ERROR in the listings and $V_{ERR}$ in the flowcharts. Here, ERROR corresponds generally to the algebraic difference between the reference velocity, as determined by the reference velocity determination unit 90, and the instantaneous wheel speed, as determined by the wheel speed determination unit 80. Thus, ERROR provides an indication of the slip velocity of the braked wheel 30.

As a preliminary matter, it should be noted that the modulator of this invention produces a modulated control signal which corresponds generally to the average level of brake pressure applied to the brake 20. Thus, a high modulator output corresponds to a high coefficient of friction between the wheel 30 and the pavement. In practice the anti-skid valve 70 is generally designed to require a large current to bring about a large reduction in brake pressure, and therefore the driver 150 is designed to invert the signal from the summing device 140 prior to amplification to obtain the desired relationship between the modulated control signal and the valve control signal.

Figure 4:
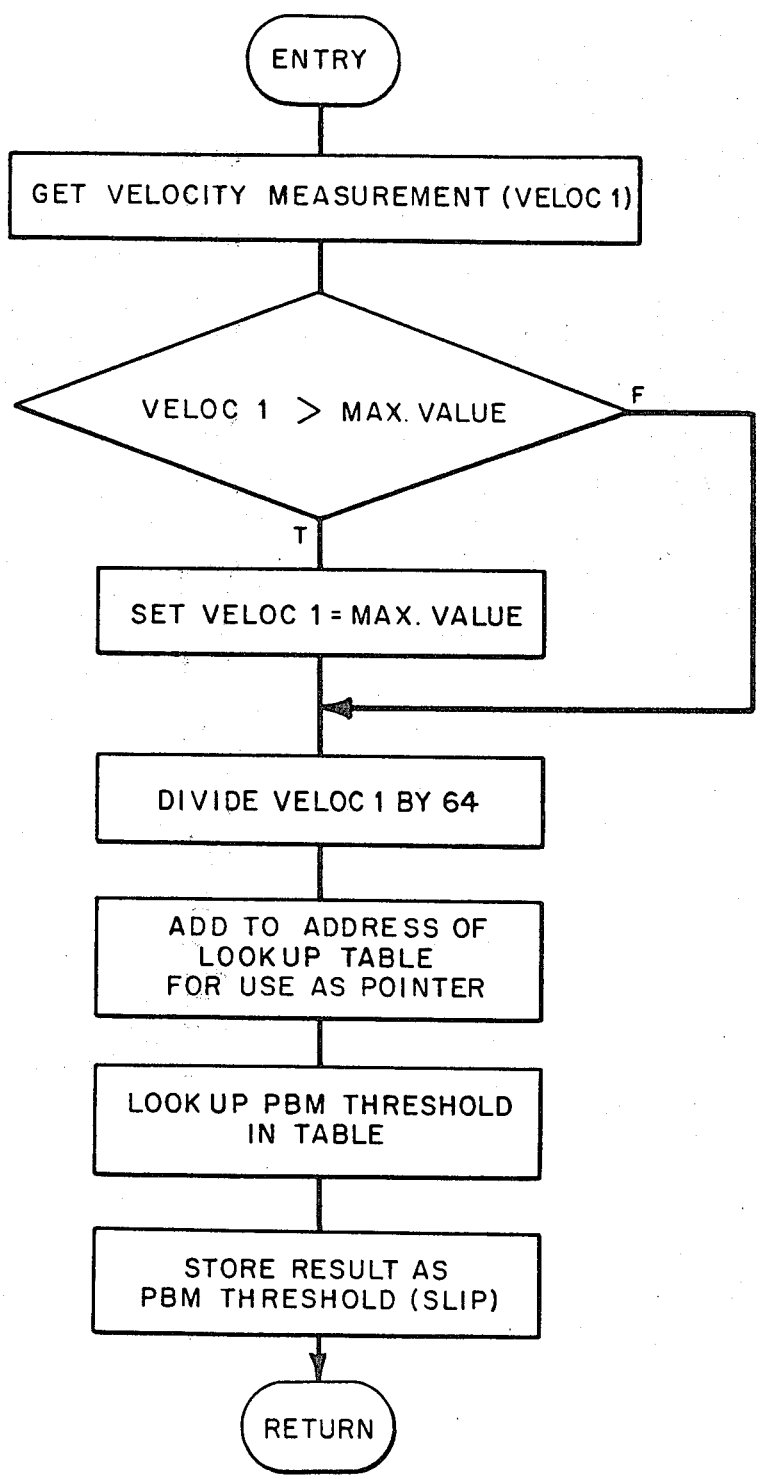
FIG. 4 is a flowchart of a second portion of the PBM determination unit of FIG. 2.

Turning now to FIG. 3, the preferred embodiment of the improved modulator of this invention accepts as an input the error velocity signal ERROR and the wheel velocity signal VELOC1 as described above, and generates a modulated brake control signal in response to these two dynamic variables. As shown in FIG. 3, the first step in the program is to obtain the current error velocity signal. The VELOC1 signal is used in the program flow charted in FIG. 4 to obtain the instantaneous threshold signal. As shown in FIG. 4, this is done by first obtaining the most recent wheel speed velocity measurement (VELOC1) and clamping VELOC1 to a maximum velocity if it exceeds that maximum velocity. Then the clamped VELOC1 is divided by 64 and the resulting value added to the beginning address of a look-up table. This look-up table is listed in Table 3, and it contains a plurality of threshold values. Depending on the instantaneous value of the pointer obtained from VELOC1, one of this plurality of threshold values is selected as the instantaneous threshold signal and stored in the variable SLIP.

Returning to FIG. 3, the program then adds the error velocity signal to the threshold signal and branches according to the sign and magnitude of the resulting sum. If the resulting sum is positive the program then selects one of five positive rate values in accordance with the size of the summation value. The selected rate value is then added to the modulated brake control signal and the resulting sum is checked for overflow. If overflow has occurred, the modulated brake control signal is set to a maximum value.

Figure 6:
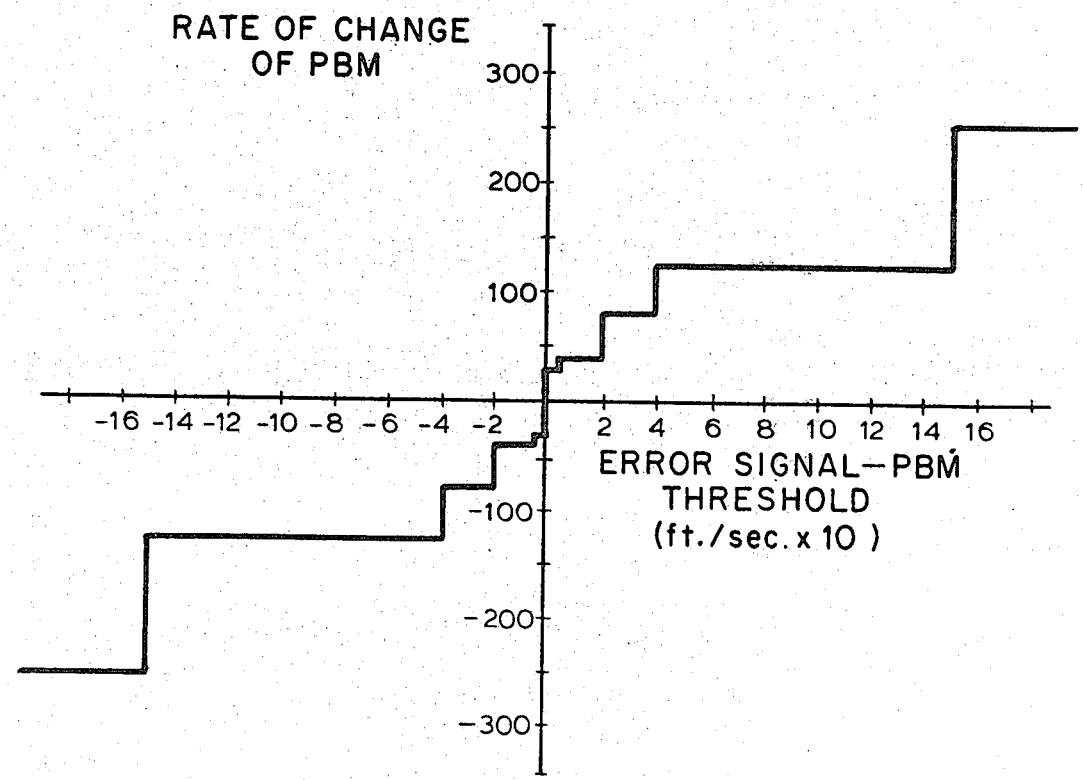
FIG. 6 is a graph showing the functional relationship between the PBM rate and the sum of the error signal and the threshold signal in the preferred embodiment of FIG. 2.

If, on the other hand, the sum of the error velocity signal and the threshold signal is negative, the resulting sum is compared with negative thresholds corresponding in magnitude to the four positive threshold values discussed above. Depending on the negative magnitude of the sum, one of five possible negative rate signals is chosen and the negative rate signal is then added to the modulated brake control signal as shown in FIG. 6. Again, the resulting sum is checked for overflow and set to zero if overflow is sensed. Finally, the modulated brake control signal is clamped to a minimum value and the clamped result is saved as the new modulated brake control signal.

By way of explanation, Table 3 stores threshold values in units of tenths of feet per second. For example, the first entry in Table 3 reads BYTE 8. This indicates that the decimal number 8 is to be stored as the first entry in the table, and this entry corresponds to eight-tenths of a foot per second threshold velocity. The second column in the table reproduced in Table 3 indicates the range of wheel velocities (measured in feet per second) which correspond to the individual entries of the table. The variables VELOC1 and ERROR are sixteen bit variables scaled to one-tenth of a foot per second per least significant bit. Additionally, the variable PBM is directly related to brake pressure and inversely related to valve current. The relationship is linear such that full scale PBM current corresponds to a PBM value of 1280 (hexadecimal) and zero PBM current corresponds to a PBM value of 7FFF (hexadecimal). Throughout this specification and the following claims, the term "sum" is used in the broad sense to denote algebraic combinations in general, including results achieved by either addition or substraction. The term "magnitude" is used to denote the absolute value of a signal, that is, the size of the signal without regard to polarity.

Figure 5:
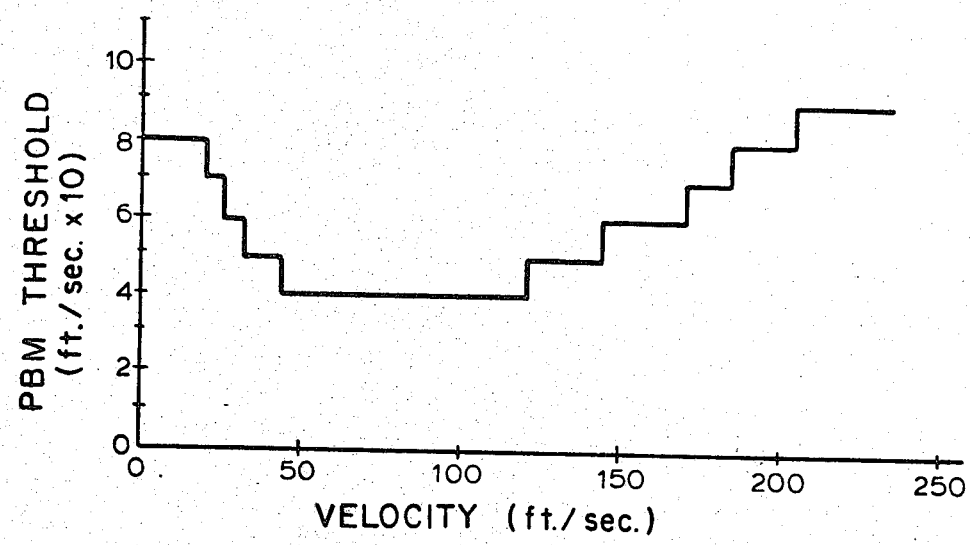
FIG. 5 is a graph showing the functional relationship between the PBM threshold and wheel velocity in the preferred embodiment of FIG. 2.

FIGS. 5 and 6 present in graphical form information which is contained in Tables 1–4, showing the manner in which the preferred embodiment described above controls the modulator threshold and the modulator rate signal determination, respectively. As shown in FIG. 5, the modulator threshold is changed as a function of wheel speed from a value of 8 at low speeds, to a low of 4 at speeds between about 50 and 125 feet/second, and then back up to 9 for speeds above about 210 feet/second. As shown in FIG. 6, the modulator rate signal is generated as a non-linear function of the difference between the error signal and the modulator threshold.

From the foregoing, it should be apparent that the disclosed program operates to generate a modulated brake control signal in response to an error velocity input signal and a wheel speed signal supplied by the remainder of the anti-skid system.

One important feature of this preferred embodiment is that the modulator response (that is the change in the modulated brake control signal) varies as a non-linear function of the sum of the error velocity signal and the threshold signal. As explained above, the presently preferred embodiment provides ten separate rate values, one of which is chosen depending on this sum. Several points should be made regarding the choice of these rate values.

First, the presently preferred embodiment uses a set of five positive rate values and a symmetrical set of five negative rate values. The use of symmetrical positive and negative rate values provides important advantages in connection with modulators used to control brakes on bogie mounted wheels which are subject to bogie oscillation. However, in other applications in which bogie oscillation is not a significant problem, assymetrical positive and negative rate values may be preferred.

Second, the embodiment described above provides a sharp change in the rate value at the point where the error signal is equal to the threshold signal. See FIG. 6. This sharp change results in a modulator response to error signals which are slightly greater than the threshold signal which is quite different than the response to error signals which are slightly less than the threshold signal. In this way the modulator is made to seek aggressively the point of optimum braking, instead of settling down at a point where the error signal is approximately equal to the threshold signal. In computer simulations, this feature of the invention has been found to enhance modulator performance. In this preferred embodiment the dynamic range of the modulated brake control signal is about 28,000 (decimal). The minimum rate value is 32 (decimal), and a rate value is added to the modulated brake control signal 203 times each second. Thus, in this embodiment, the modulated brake control signal is modified 203 times a second by an amount which is always greater than one tenth of one percent of the dynamic range of the modulated brake control signal. This corresponds to a minimum change in the modulated brake control signal of about 20% of the full dynamic range of the modulated brake control signal per second.

Third, this embodiment provides a modulator gain (defined for this embodiment as the ratio between the rate of change of the modulated brake control signal and the sum of the error signal and the threshold signal) which generally decreases with increasing values of the sum. This feature of the invention has been found to improve modulator response to wheel skids in computer simulation. In particular, modulator response to the large error signals associated with wheel skids was examined in computer simulation, and the rate signals associated with large error signals were then adjusted to optimize modulator operation.

Of course, it should be understood that various changes and modifications to the preferred embodiment described above will be apparent to those skilled in the art. For example, the invention can be used with acceleration based as well as velocity based modulators. In addition, the correspondence between the input signal and the rate signal, as well as other stored constants, can be chosen to fit other applications. The invention can be embodied in analog as well as digital forms; and other signals generally indicative of wheel speed, such as the reference velocity generated by the reference velocity determination unit 90, for example, can be used in place of the wheel speed signal to select the threshold signal. Of course, the rate signal generation invention defined by the following claims can be used with other, prior art circuits for generating thresholds, in addition to the threshold generating circuit described above. Such changes and modifications can be made without departing from the spirit and scope of the present invention, and without diminishing its attendant advantages. It is therefore intended that such changes and modifications be covered by the following claims.

TABLE 1

```
;
;           PBM FUNCTION
;           ********************
PBMX    LD HL, (ERROR)
        LD D,0
        LD E, (IY+SLIP-RAM); PBM THRESHOLD VALUE
        ADD HL,DE
        EX DE,HL
        BIT 7,D
        JR NZ,PBMA; JUMP IF NEG (REF VELOCITY)
        LD HL,PBMTHR1; POSITIVE THRESHOLD 1
        XOR A
        SBC HL,DE
        JR C,PBMB
        LD HL,PBMRTE1; POSITIVE RATE 1
        JR PBMC
PBMB    LD HL,PBMTHR2; THRESHOLD 2
        XOR A
        SBC HL,DE
        JR C,PBMD
        LD HL,PBMRTE2; RATE 2
        JR PBMC
PBMD    LD HL,PBMTHR3; THRESHOLD 3
        XOR A
        SBC HL,DE
        JR C,PBMI
        LD HL,PBMRTE3; RATE 3
        JR PBMC
PBMI    LD HL,PBMTHR4; THRESHOLD 4
        XOR A
        SBC HL,DE
        JR C,PBMJ
        LD HL,PBMRTE4; RATE 4
        JR PBMC
PBMJ    LD HL,PBMRTE5; THRESHOLD 5
PBMC    LD DE,(PBM)
        ADD HL,DE
        BIT 7,H; CHECK FOR OVERFLOW
        JR Z,PBME
        LD HL,7FFFH; CLAMP TO MAX
        JR PBME
PBMA    LD HL,-PBMTHR1; NEGATIVE THRESHOLD 1
        XOR A
        SBC HL,DE
        JR NC,PBMF
        LD HL,-PBMRTE1; NEGATIVE RATE 1
        JR PBMG
PBMF    LD HL,-PBMTHR2; THRESHOLD 2
        XOR A
        SBC HL,DE
        JR NC,PBMH
        LD HL,-PBMRTE2; RATE 2
        JR PBMG
PBMH    LD HL, -PBMTHR3
        XOR A
        SBC HL,DE
        JR NC,PBMK
        LD HL, -PBMRTE3
        JR PBMG
PBMK    LD HL, -PBMTHR4
        XOR A
        SBC HL,DE
        JR NC,PBML
        LD HL, -PBMRTE4
        JR PBMG
PBML    LD HL, -PBMRTE5
PBMG    LD DE,(PBM)
        ADD HL,DE
        BIT 7,H; CHECK FOR OVERFLOW
        JR Z,PBME
        LD HL,0; CLAMP TO MIN VALUE
PBME    EX DE,HL
        LD HL,MAXPBM; PBM CLAMP VALUE
        XOR A
        SBC HL,DE
        JR C,PBMM; VALUE GOOD, JUMP
        LD DE,MAXPBM
```

TABLE 1-continued

```
;
;           PBM FUNCTION
;           ********************
PBMM    LD (PBM),DE
        SRL D
        RR E
        SRL D
        RR E
        SRL D
        RR E
        LD B,D
        LD C,E; SAVE SUM IN "BC"
```

TABLE 2

```
;
;           13. PBM THRESHOLD GENERATION
;           ****************************
        LD HL,(VELOC1)
        LD A,H
        CP MAXVEL/256
        JR C,TORQA
        LD HL,MAXVEL
TORQA   SLA L
        RL H
        SLA L
        RL H; MULTIPLY BY 4
        LD L,H
        LD H,0; DIVIDE BY 256
        LD DE,TABLE2
        ADD HL,DE
        LD A,(HL)
        LD (SLIP),A; SAVE THRESHOLD VALUE
```

TABLE 3

VARIABLE PBM THRESHOLD LOOK UP TABLE

| | THRESHOLD (FT/SEC × 10) | VELOCITY (FT/SEC) |
|---|---|---|
| TABLE 2 | BYTE 8; | 0-6.3 |
| | BYTE 8; | 12.7 |
| | BYTE 8; | 19.1 |
| | BYTE 7; | 25.5 |
| | BYTE 6; | 31.9 |
| | BYTE 5; | 38.3 |
| | BYTE 5; | 44.7 |
| | BYTE 4; | 51.1 |
| | BYTE 4; | 57.5 |
| | BYTE 4; | 63.9 |
| | BYTE 4; | 70.3 |
| | BYTE 4; | 76.7 |
| | BYTE 4; | 83.1 |
| | BYTE 4; | 89.5 |
| | BYTE 4; | 95.4 |
| | BYTE 4; | 102.3 |
| | BYTE 4; | 108.7 |
| | BYTE 4; | 115.1 |
| | BYTE 4; | 121.5 |
| | BYTE 5; | 127.9 |
| | BYTE 5; | 134.3 |
| | BYTE 5; | 140.7 |
| | BYTE 5; | 147.1 |
| | BYTE 6; | 153.5 |
| | BYTE 6; | 159.9 |
| | BYTE 6; | 166.3 |
| | BYTE 6; | 172.7 |
| | BYTE 7; | 179.1 |
| | BYTE 7; | 185.5 |
| | BYTE 8; | 191.9 |
| | BYTE 8; | 198.3 |
| | BYTE 8; | 204.7 |
| | BYTE 9; | 211.1 |

TABLE 3-continued

VARIABLE PBM THRESHOLD LOOK UP TABLE

| THRESHOLD (FT/SEC × 10) | VELOCITY (FT/SEC) |
|---|---|
| BYTE 9; | 217.5 |
| BYTE 9; | 223.9 |
| BYTE 9; | 230.3 |
| BYTE 9; | 236.7 |

TABLE 4

```
;       ********
;       *      *
;       * RAM  *
;       *      *
;       ********
;
ERROR   EQU 815H; ERROR VALUE FOR CONTROL
        (TWO BYTES)
PBM     EQU 80AH; PBM VALUE (TWO BYTES)
SLIP    EQU 819H; SLIP VELOCITY VALUE
        (ONE BYTE)
VELOC1  EQU 820H; NEW VELOCITY
;
;
;
;       **************************
;       *                        *
;       * GENERAL CONSTANTS *
;       *                        *
;       **************************
;
MAXVEL  EQU 2304; 230.4 FT/SEC
        VELOCITY CLAMP FOR PBM TRESHOLD
MAXPBM  EQU 4736; MAX PBM CLAMP
        (SET AT 55 MA-47 MA = 8 MA)
PBMTHR1 EQU 4; THRESHOLD 1 (.4 FT/SEC)
PBMTHR2 EQU 20; THRESHOLD 2 (2 FT/SEC)
PBMTHR3 EQU 40; THRESHOLD 3 (4 FT/SEC)
PBMTHR4 EQU 150; THRESHOLD 4 (15 FT/SEC)
;
PBMRTE1 EQU 32; RATE 1
PBMRTE2 EQU 40
PBMRTE3 EQU 80
PBMRTE4 EQU 128
PBMRTE5 EQU 256
;
```

I claim:

1. In an anti-skid braking system for modifying the action of a brake application means for a braked wheel of a vehicle, said system including means for utilizing information obtained from the rotation of said wheel to generate an input signal indicative of a braking condition; modulator means, responsive to the input signal, for generating a modulated brake control signal; and means, responsive to the modulated brake control signal, for modifying the action of the brake application means; the improvement comprising:

means, included in the modulator means, for generating a rate signal, said rate signal including a non-linear function of the input signal such that the change in the rate signal for a selected change in the input signal varies as a freely selectable function of the magnitude of the input signal; and means, included in the modulator means, for generating the modulated brake control signal as a time integral function of the rate signal, said non-linear function chosen to promote effective control of the action of the brake application means.

2. The invention of claim 1 wherein the rate signal generating means generates a sharp step increase in the rate signal when the input signal crosses a threshold value.

3. The invention of claim 1 wherein the change in the rate signal for a selected change in the input signal generally decreases as the magnitude of the input signal increases.

4. The invention of claim 1 wherein the magnitude of the rate signal is a function of the magnitude of the input signal, the polarity of the rate signal is a function of the polarity of the input signal, and the magnitude of the rate signal is independent of the polarity of the input signal.

5. In an anti-skid braking system for modifying the action of a brake application means for a braked wheel of a vehicle, said system including means for utilizing information obtained from the rotation of said wheel to generate an input signal indicative of a braking condition; modulator means, responsive to the input signal, for generating a modulated brake control signal; means, included in the modulator means, for generating a threshold signal; and means, responsive to the modulated brake control signal, for modifying the action of the brake application means, the improvement comprising:

means, included in the modulator means, for generating a rate signal as a function of the sum of the threshold signal and the input signal, said rate signal including a non-linear function of the sum such that the ratio between the sum and the rate signal when the sum is in a first range of values is greater than the ratio between the sum and the rate signal when the sum is in a second range of values, distinct from the first range of values; and means, included in the modulator means, for generating the modulated brake control signal as a time integral function of the rate signal, said non-linear function chosen to optimize the determination of the time integral function to promote effective control of the action of the brake application means.

6. The invention of claim 5 wherein the rate generating means generates a sharp step in the rate signal when the sum crosses a crossover value.

7. The invention of claim 6 wherein the crossover value is zero.

8. The invention of claim 5 wherein a selected change in the sum results in a generally decreasing change in the rate signal as the magnitude of the sum increases.

9. The invention of claim 5 wherein the magnitude of the rate signal is a function of the magnitude of the sum and is independent of the polarity of the sum.

10. In an anti-skid braking system for modifying the action of a brake application means for a braked wheel of a vehicle, said system including means for utilizing information obtained from the rotation of said wheel to generate an input signal indicative of a braking condition, means, included in the modulator means, for generating a threshold signal, and means, responsive to a modulated brake control signal, for modifying the action of the brake application means, the improvement comprising:

a computer;

means, included in the computer, for storing a plurality of rate signals;

means, included in the computer, for algebraically combining the threshold signal and the input signal to form a summation signal;

means, included in the computer, for selecting one of the plurality of rate signals in response to the amplitude of the summation signal, said rate signal varying as a non-linear function of the summation signal such that the ratio between the rate signal and the summation signal when the summation signal is in a first range of values is greater than the ratio between the rate signal and the summation signal when the summation signal is in a second range of values, distinct from the first range of values; and means, included in the computer, for generating the modulated brake control signal as a time integral function of the selected one of the plurality of rate signals, said non-linear function chosen to match the determination of the time integral function to the vehicle and the braked wheel to promote effective control of the action of the brake application means.

11. The invention of claim 10 wherein the rate signal corresponding to a value of the summation signal slightly less than a crossover value is sharply different from the rate signal corresponding to a value of the summation signal slightly more than the crossover value.

12. The invention of claim 11 wherein the crossover value is zero.

13. The invention of claim 10 wherein the summation signals in the first range of values are less than summation signals in the second range of values.

14. The invention of claim 10 wherein the rate signals are chosen such that the magnitude of the selected one of the rate signals is a function of the magnitude of the summation signal and independent of the polarity of the summation signal.

15. In an anti-skid braking system for modifying the action of a brake application means for a braked wheel of a vehicle, said system including means for utilizing information obtained from the rotation of said wheel to generate an input signal indicative of a braking condition, means, included in the modulator means, for generating a threshold signal, and means, responsive to a modulated brake control signal, for modifying the action of the brake application means, the improvement comprising:

a computer;

means, included in the computer, for storing a plurality of rate signals;

means, included in the computer, for algebraically combining the threshold signal and the input signal to form a summation signal;

means, included in the computer, for selecting one of the plurality of rate signals in response to the amplitude of the summation signal such that a first rate signal is selected in response to a value of the summation signal slightly less than a crossover value, a second rate signal is selected in response to a value of the summation signal slightly greater than the crossover value, the polarity of the first rate signal is opposite to the polarity of the second rate signal, and the magnitudes of the first and second rate values provide a sharp change in the selected one of the rate values when the summation signal crosses the crossover value, such that the selected one of the plurality of rate signals does not approach zero as the summation signal crosses the crossover value; and means, included in the computer, for generating the modulated brake control signal as a time integral function of the selected one of the plurality of rate signals such that the rate of change of the modulated brake control signal always remains above a selected value.

16. The invention of claim 15 wherein the crossover value is zero.

17. The invention of claim 15 wherein the selected value is about 20 percent of full dynamic range of the modulated brake control signal per second.

18. The invention of claim 15 wherein the magnitudes of both the first and second rate values are greater than about one tenth of one percent of the full dynamic range of the modulated brake control signal.

19. In an anti-skid braking system for modifying the action of a brake application means for a braked wheel of a vehicle, said system including means for utilizing information obtained from the rotation of said wheel to generate an input signal indicative of a braking condition; modulator means, responsive to the input signal, for generating a modulated brake control signal; and means, responsive to the modulated brake control signal, for modifying the action of the brake application means; the improvement comprising:

means, included in the modulator means, for generating a rate signal as a non-linear function of the input signal, said non-linear function chosen to match the determination of the time integral function to the vehicle to promote effective control of the action of the brake application means, said rate signal having a magnitude which is always above a selected value greater than zero; and means, included in the modulator means, for generating the modulated brake control signal as a time integral function of the rate signal such that the time rate of change of the modulated brake control signal remains above a selected time rate of change.

20. The invention of claim 19 wherein the selected rate of change of the modulated brake control signal is about 20 percent of the full dynamic range of the modulated brake control signal per second.

21. The invention of claim 19 wherein the selected value of the rate signal is greater than about one tenth of one percent of the full dynamic range of the modulated brake control signal.

* * * * *

UNITED STATES PATENT AND TRADEMARK OFFICE
CERTIFICATE OF CORRECTION

PATENT NO. : 4,338,668
DATED : July 6, 1982
INVENTOR(S) : Robert D. Cook

It is certified that error appears in the above—identified patent and that said Letters Patent is hereby corrected as shown below:

Column 1, line 45, add --Throughout the following specification and claims the modulator rate signal will be referred to simply as the "rate signal".--

Column 3, line 16 add --to-- immediately before "decrease".

Column 4, line 52, add --velocity-- immediately before the word "signal" (second occurrence).

Column 5, line 52, add --about-- immediately before "125 feet/-".

Signed and Sealed this

Fifteenth Day of February 1983

[SEAL]

Attest:

GERALD J. MOSSINGHOFF

Attesting Officer

Commissioner of Patents and Trademarks